March 23, 1954  A. H. B. WALKER  2,673,323
VOLTAGE REGULATING APPARATUS FOR ALTERNATING
ELECTRIC CURRENT CIRCUITS
Filed Dec. 23, 1948  2 Sheets-Sheet 1

INVENTOR:
ALEC HERVEY BENNETT WALKER
BY:

UNITED STATES PATENT OFFICE 2,673,323

VOLTAGE REGULATING APPARATUS FOR ALTERNATING ELECTRIC CURRENT CIRCUITS

Alec Hervey Bennett Walker, London, England, assignor to Westinghouse Brake and Signal Company Limited, London, England Application December 23, 1948, Serial No. 67,035

Claims priority, application Great Britain January 22, 1948

9 Claims. (Cl. 323—45)

This invention relates to voltage regulating apparatus for alternating electric current circuits adapted to maintain a substantially constant voltage at the terminals of a load circuit supplied with alternating current or through a rectifier system with uni-directional current from an alternating current supply circuit regardless of variations in the load, or the supply circuit voltage or frequency.

More particularly the invention relates to voltage regulating apparatus of this character comprising essentially a capacitative reactance such for example as the apparatus described in the specification of Patent No. 2,209,948, and has for its object to enable apparatus of this kind to provide compensation for any variable, such, for example, as supply circuit frequency, or to complete the compensation already provided by the apparatus for variations in the load and the supply circuit voltage.

According to the invention, this purpose is attained by varying the effective capacity of the circuit containing the capacitative reactance above referred to by varying the reactance of a saturated choke coil device connected in series or parallel with the capacitative reactance circuit, the saturating or control winding of the choke coil device being supplied with uni-directional current which is arranged to be varied in accordance with the variable for which compensation is required.

Figure 1:
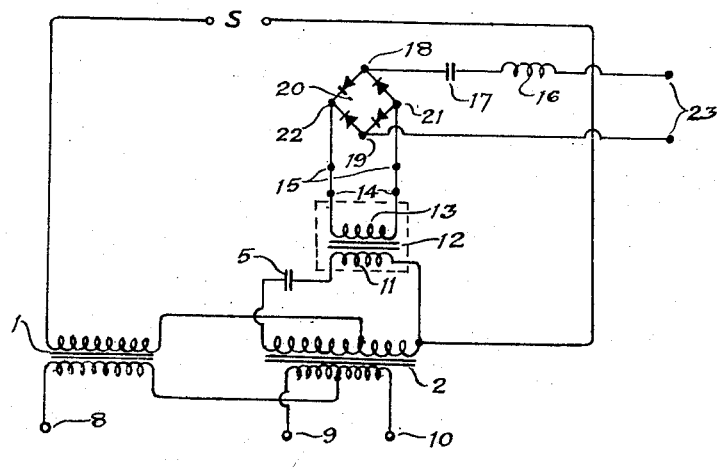
Figure 2:
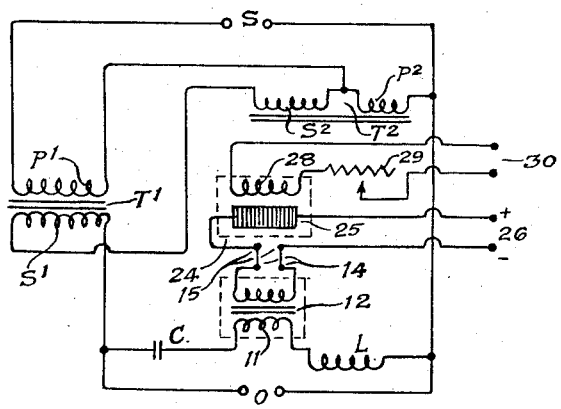
Figure 3:
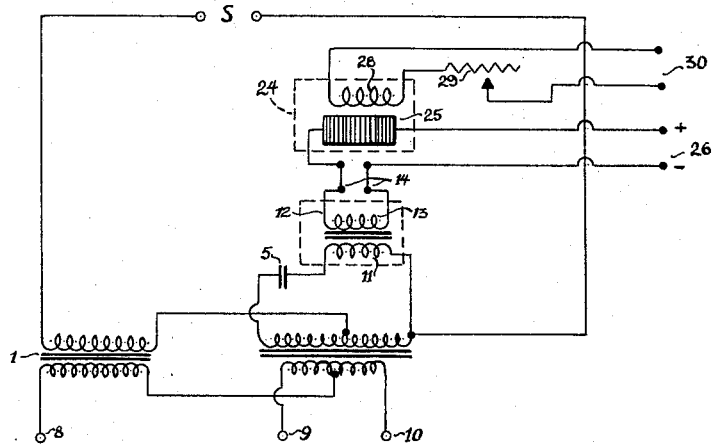
Figure 4:
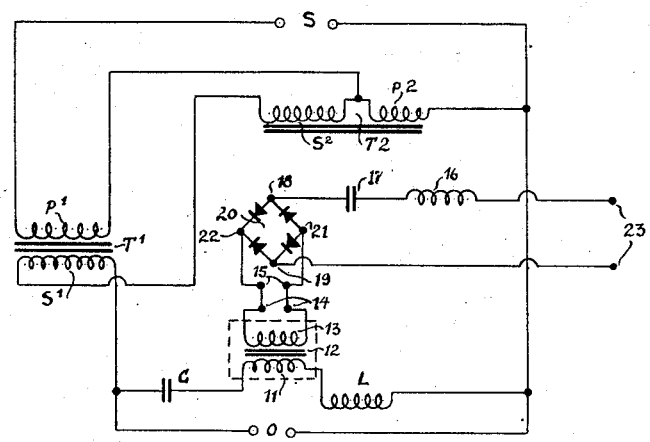

The invention is illustrated by way of example in the accompanying drawings of which Figures 1 and 4 are diagrams showing one form of compensating device according to the invention as applied to two types of the voltage regulating apparatus of the kind above referred to, Figures 2 and 3 being diagrams showing an alternative form of compensating device according to the invention as applied to the two types of voltage regulating apparatus shown in Figures 1 and 4.

Referring now to Figure 1 it will be seen that as in Figure 2 of the drawings of the complete specification of Patent No. 2,209,948 the voltage regulating apparatus to which the present invention is applied comprises transformers 1 and 2 connected as shown in Figure 2 of the earlier patent specification the condenser 5 being however arranged to be supplied as shown in Figure 3 of that specification. The terminals 8, 9, 10 of the secondary windings of the transformers 1, 2 are connected to the rectifiers 4 (not shown) of Figure 2 of specification No. 2,209,948 as therein shown.

Connected in series with the condenser 5 is the winding 11 of a saturated choke coil device 12 the control winding 13 of which is supplied with uni-directional current from terminals 14. These terminals are supplied with current from a source or device dependent upon the compensation required.

The terminals 14 may, for example, be connected to the terminals 15 of the compensating device which comprises a resonant circuit including an inductance 16, a condenser 17 and the input terminals 18, 19 of a bridge-connected rectifier system 20, the output terminals 21, 22 of which are connected to the terminals 15. The resonant circuit above referred to is supplied with alternating current through the terminals 23 which are connected either to the alternating current circuit supplying the primary windings of the transformers 1, 2 or to the terminals of the secondary winding of the transformer 2.

In either case by suitably determining the electrical characteristics of the resonant circuit the controlling winding 13 of the choke coil device 12 can be arranged to vary the impedance of the winding 11 of this device, and thus vary the voltage applied to the condenser 5 in accordance with changes in the frequency of the alternating current circuit supplying the transformers 1, 2.

The compensating device shown in Figure 3 may also or alternatively be so designed as to constitute a trimming or fine adjustment of the compensation for variations in the supply circuit voltage effected by the voltage regulating apparatus shown in Figure 1.

The compensating device shown in Figure 3 comprises a carbon-pile regulator device 24 the carbon pile 25 of which is connected in series with the terminals 26 of a source of uni-directional current to the terminals 27 which are connected to the terminals 14 of the choke coil device 12.

The control coil 28 of the device 24 varying the effective resistance of the pile 25 is connected through an adjustable resistance 29 to the terminals 30 of the compensating device, these terminals being supplied with uni-directional current controlled in accordance with the output voltage or other variable of the voltage regulating apparatus to be compensated for.

Referring now to Figures 2 and 4 it will be seen that the voltage regulating apparatus comprises a condenser C connected in series with an inductance L across the load circuit terminals O.

Connected in series in the circuit including the condenser C and the inductance L is the winding 11 of a choke coil device 12 the control winding 13 of which is supplied with uni-directional current as already described with reference to Figures 3 and 1, respectively.

If desired, the condenser C may be divided into two portions of which one is connected directly in series with the inductance L across the load terminals O, the other portion of the condenser being connected as shown in Figures 2 and 4.

The saturated choke coil device 12 shown in the figures will in practice preferably be constructed as two separate devices having their control windings connected in opposition or as a three-limbed magnetic core having its windings 11 and 13 distributed in the well known way.

The compensating choke coil device 12 above described may be embodied in the voltage regulating apparatus itself or if desired may constitute a separate unit to be connected to the apparatus.

The invention is evidently not limited in its application to the particular forms of voltage regulating apparatus above described by way of example, but may be utilised in connection with any apparatus of this kind embodying a capacitative reactance circuit serving in conjunction with other elements of the apparatus to provide a substantially constant voltage at the load terminals.

Having thus described my invention, what I claim is:

1. Voltage regulating apparatus for alternating current circuits, comprising in combination, a first transformer; a second transformer; a primary winding in each of said transformers, said primary windings being connected in series and adapted for being connected across a source of alternating current; a secondary winding in each of said transformers, said secondary windings being connected to output terminals; a predominantly capacitive circuit associated with one of said transformers and including an inductive reactance having an impedance winding; a control winding for controlling the inductive impedance of said impedance winding; and means for supplying direct current to said control winding.

2. Voltage regulating apparatus for alternating current circuits, comprising in combination, a first transformer; a second transformer; a primary winding, a secondary winding, and a core in each of said transformers, said primary windings being connected in series and said secondary windings being connected in series opposition, one of said cores having at normal loading a flux density above the knee of the B—H curve of the core material; a predominantly capacitative circuit including a capacitive reactance and an inductive reactance having an impedance winding, said circuit being connected across said primary of said transformer having a flux density above the knee of the B—H curve; a control winding on said inductive reactance; a source of direct current for energizing said control winding; and means for automatically varying said direct current so as to compensate for variations in a predetermined variable.

3. Voltage regulating apparatus for alternating current circuits, comprising in combination, input terminals; output terminals; a first transformer; a second transformer; a primary winding, a secondary winding and a core in each of said transformers, said primary windings being connected in series across said input terminals and said secondary windings being connected in series opposition across said output terminals, one of said cores having at normal loading a flux density above the knee of the B—H curve of the core material; an impedance circuit including a condenser and a saturable inductive reactance connected in series across said output terminals; a control winding on said saturable inductive reactance for varying the inductive impedance of said inductive reactance and thereby varying the capacitative reactance of said impedance circuit; and means for supplying direct current to said control winding, said direct current depending upon the value of a predetermined variable, whereby the voltage across said output terminals is maintained substantially constant regardless of variations of the predetermined variable.

4. Voltage regulating apparatus for alternating current circuits, comprising in combination, a first transformer; a second transformer; a primary winding, a secondary winding, and a core in each of said transformers, said primary windings being connected in series and said secondary windings being connected in series opposition; one of said cores having at normal loading a flux density above the knee of the B—H curve of the core material; a predominantly capacitative circuit including a condenser and an inductive reactance having an impedance winding, said circuit being connected across said primary of said transformer having a flux density above the knee of the B—H curve; a control winding on said inductive reactance; a rectifier having output terminals connected to said control winding and input terminals connected across the source of alternating current; and a series circuit including the source of alternating current, an inductance and a second condenser forming a circuit resonant at a predetermined frequency, whereby changes in the frequency of the alternating current source cause corresponding changes in the impedance of said circuit which counteracts a tendency for the output voltages of said transformer to vary as a result of the changes of frequency.

5. A phase shifting arrangement for an alternating current circuit, comprising, in combination, a saturated transformer including a core, a secondary winding and a primary winding; an unsaturated transformer including a core, a secondary winding and a primary winding being connected in series with at least part of said primary winding of said saturated transformer, said series connected parts of said primary windings adapted for being connected across a source of alternating current and said secondary winding of said unsaturated transformer being connected in series with at least part of said secondary winding of said saturated transformer so as to combine the output voltages induced in said secondary windings of said unsaturated and saturated transformers and supply a combined output voltage; a predominantly capacitive circuit associated with one of said windings of said saturated transformer and including a capacitive reactance and an inductive reactance, said circuit being arranged for influencing the current flowing in said one winding of said saturated transformer; a control winding on said inductive reactance; a source of direct current for energizing said control winding; and means for varying said direct current whereby the current flowing in said one winding of the saturated transformer is varied so as to impart an adjustable shift to the phase of the output voltage induced in the secondary winding of the saturated transformer relative to the phase of the output voltage induced in the secondary winding of the unsaturated transformer resulting in corresponding variations of the combined output voltage supplied by the secondary windings of the transformers.

6. A phase shifting arrangement for an alternating current circuit, comprising, in combination, a saturated transformer including a core, a secondary winding and a primary winding; an unsaturated transformer including a core, a secondary winding and a primary winding being connected in series with at least part of said primary winding of said saturated transformer, said series connected parts of said primary windings adapted for being connected across a source of alternating current and said secondary winding of said unsaturated transformer being connected in series with at least part of said secondary winding of said saturated transformer so as to combine the output voltages induced in said secondary windings of said unsaturated and saturated transformers and supply a combined output voltage; a predominantly capacitive circuit associated with said primary winding of said saturated transformer and including a capacitive reactance and an inductive reactance, said circuit being arranged for influencing the current flowing in said primary winding of said saturated transformer; a control winding on said inductive reactance; a source of direct current for energizing said control winding; and means for varying said direct current whereby the current flowing in the primary winding of the saturated transformer is varied so as to impart an adjustable shift to the phase of the output voltage induced in the secondary winding of the saturated transformer relative to the phase of the output voltage induced in the secondary winding of the unsaturated transformer resulting in corresponding variations of the combined output voltage supplied by the secondary windings of the transformers.

7. Voltage regulating apparatus for alternating current circuits, comprising in combination, input terminals; output terminals; first transformer; a second transformer; a primary winding, a secondary winding and a core in each of said transformers, said primary windings being connected in series across said input terminals and said secondary windings being connected in series opposition across said output terminals; one of said cores having at normal loading a flux density above the knee of the B—H curve of the core material; an impedance circuit including a condenser, and a saturable inductive reactance connected in series across said output terminals; a control winding on said saturable inductive reactance for varying the inductive impedance of same and thereby varying the capacitive reactance of said impedance circuit; a rectifier having output terminals connected to said control winding and input terminals for connection across a source of alternating current; a second condenser and a second inductive reactance; and a series circuit including said second condenser said second inductive reactance and said rectifier input terminals resonant at a predetermined frequency.

8. Voltage regulating apparatus for alternating current circuits, comprising in combination, input terminals; output terminals; a first transformer; a second transformer; a primary winding; a secondary winding and a core in each of said transformers; said primary windings being connected in series across said input terminals and said secondary windings being connected in series opposition across said output terminals; one of said cores having at normal loading a flux density above the knee of the B—H curve of the core material; a predominately capacitive circuit including a condenser and a saturable inductive reactance connected across said primary winding of said transformer having the core with a flux density above the knee of the B—H curve; a control winding on said saturable inductive reactance; a regulating device having a resistance element; a source of direct current; a series circuit including said control winding, said resistance element and said source of direct current; an operating winding on said regulating device for varying the resistance of said resistance element; and means for energizing said operating winding in accordance with the voltage the variations of which are to be compensated.

9. Voltage regulating apparatus for alternating current circuits comprising, in combination, a first transformer; a second transformer; a primary winding, a secondary winding and a core in each of said transformers, said primary windings being connected in series with each other and said secondary windings being connected in series opposition with each other; one of said cores having at normal loading a flux density above the knee of the B—H curve of the core material; a predominately capacitive circuit including a condenser and a saturable inductive reactance connected across said primary winding of said transformer having the core with a flux density above the knee of the B—H curve; a control winding on said saturable inductive reactance; a regulating device having a resistance element; a source of direct current; a series circuit including said control winding said resistance element and said source of direct current; an operating winding on said regulating device for varying the resistance of said resistance element; and means for energizing said operating winding in accordance with the voltage the variations of which are to be compensated.

ALEC HERVEY BENNETT WALKER.

References Cited in the file of this patent

UNITED STATES PATENTS

| Number | Name | Date |
|---|---|---|
| 1,942,535 | Cairns | Jan. 9, 1934 |
| 2,085,061 | Aggers | June 29, 1937 |
| 2,278,151 | Runaldue | Mar. 31, 1942 |
| 2,413,263 | Suter | Dec. 24, 1946 |
| 2,437,837 | Saretzky | Mar. 16, 1948 |
| 2,441,967 | Haug | May 25, 1948 |

FOREIGN PATENTS

| Number | Country | Date |
|---|---|---|
| 479,596 | Great Britain | Feb. 8, 1938 |
| 612,442 | Great Britain | Nov. 12, 1948 |